United States Patent
Wang et al.

(10) Patent No.: US 12,322,828 B2
(45) Date of Patent: Jun. 3, 2025

(54) VALVE, BATTERY, POWER CONSUMPTION DEVICE AND MANUFACTURING APPARATUS AND METHOD FOR VALVE

(71) Applicant: CONTEMPORARY AMPEREX TECHNOLOGY (HONG KONG) LIMITED, Hong Kong (CN)

(72) Inventors: Zhichao Wang, Ningde (CN); Liwen Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 756 days.

(21) Appl. No.: 17/534,883

(22) Filed: Nov. 24, 2021

(65) Prior Publication Data
US 2022/0209359 A1 Jun. 30, 2022

Related U.S. Application Data (63) Continuation of application No. PCT/CN2020/139774, filed on Dec. 26, 2020.

(51) Int. Cl.
*H01M 50/317* (2021.01)
*F16K 17/00* (2006.01)
(Continued)

(52) U.S. Cl.
CPC ......... *H01M 50/317* (2021.01); *F16K 17/003* (2013.01); *H01M 50/30* (2021.01);
(Continued)

(58) Field of Classification Search
CPC .. H01M 50/317; H01M 50/30; H01M 50/383; H01M 50/375; H01M 50/342;
(Continued)

(56) References Cited

U.S. PATENT DOCUMENTS 6,562,517 B1 * 5/2003 Misra .................. H01M 50/394
429/57
2013/0032219 A1 2/2013 Heim et al.
(Continued)

FOREIGN PATENT DOCUMENTS

CN 104716289 A 6/2015
CN 106785182 A 5/2017
(Continued)

OTHER PUBLICATIONS

First Office Action dated Jun. 15, 2024 received in Chinese Patent Application No. CN 202080102732.5.
(Continued)

*Primary Examiner* — Minh Q Le
(74) *Attorney, Agent, or Firm* — Scully, Scott, Murphy & Presser, P.C.

(57) ABSTRACT

Embodiments of the present application provide a valve, a battery, a power consumption device and an apparatus and a method for manufacturing the valve, and belong to the technical field of batteries. The valve includes a valve body and a closing member, the valve body being provided with a medium injection port. The closing member is configured to open the medium injection port when a pressure or a temperature inside the box body reaches a threshold, so as to relieve the pressure inside the box body and allow the fire-fighting device to inject a fire-fighting medium into the box body. The fire-fighting device can be connected to the medium injection port, and the fire-fighting medium can enter the box body, so as to cool the battery cell inside the box body and reduce the risk of large-area thermal diffusion of the battery cell inside the box body.

20 Claims, 6 Drawing Sheets

(51) Int. Cl.
   *H01M 50/30* (2021.01)
   *H01M 50/342* (2021.01)
   *H01M 50/375* (2021.01)
   *H01M 50/383* (2021.01)
   *H01M 50/20* (2021.01)
   *H01M 50/249* (2021.01)

(52) U.S. Cl.
   CPC ....... *H01M 50/342* (2021.01); *H01M 50/375* (2021.01); *H01M 50/383* (2021.01); *H01M 50/20* (2021.01); *H01M 50/249* (2021.01); *H01M 2220/20* (2013.01); *Y02E 60/10* (2013.01)

(58) Field of Classification Search
   CPC ............... H01M 50/249; H01M 50/20; H01M 2220/20; F16K 17/003; Y02E 60/10
   USPC ........................ 137/68.12; 320/134, 135, 136
   See application file for complete search history.

(56) References Cited

U.S. PATENT DOCUMENTS

| | | | | |
|---|---|---|---|---|
| 2013/0146603 | A1* | 6/2013 | Brilmyer | H01M 50/24 220/560.01 |
| 2014/0227565 | A1* | 8/2014 | Wan | H01M 50/3425 429/56 |
| 2016/0036025 | A1* | 2/2016 | Hofer | H01M 50/325 429/56 |
| 2018/0269440 | A1 | 9/2018 | Lee et al. | |
| 2019/0115572 | A1* | 4/2019 | Fees | B60K 1/04 |
| 2019/0348702 | A1 | 11/2019 | Zhu et al. | |
| 2019/0360602 | A1* | 11/2019 | Burke | F16K 17/02 |
| 2021/0316178 | A1* | 10/2021 | Hong | A62C 35/026 |
| 2021/0320376 | A1* | 10/2021 | Zbiral | H01M 50/325 |
| 2022/0193471 | A1* | 6/2022 | Zhang | A62C 3/07 |
| 2023/0163409 | A1* | 5/2023 | Shin | H01M 50/383 429/53 |
| 2023/0198082 | A1* | 6/2023 | Khammassi | H01M 50/172 429/53 |
| 2023/0216135 | A1* | 7/2023 | Xu | H01M 50/342 429/56 |
| 2023/0246287 | A1* | 8/2023 | Zhu | H01M 50/375 429/56 |
| 2023/0358327 | A1* | 11/2023 | Clericus | F16K 15/148 |
| 2024/0332728 | A1* | 10/2024 | Kalb | H01M 10/486 |

FOREIGN PATENT DOCUMENTS

| | | |
|---|---|---|
| CN | 106876629 A | 6/2017 |
| CN | 207690840 U | 8/2018 |
| CN | 209104274 U | 7/2019 |
| CN | 210542972 U | 5/2020 |
| CN | 112086605 A | 12/2020 |
| CN | 112103445 A | 12/2020 |
| EP | 3352243 A1 | 7/2018 |
| WO | 2017/213132 A1 | 12/2017 |

OTHER PUBLICATIONS

1 Notification of Registration dated Dec. 11, 2024 received in Chinese patent Application No. 202080102732.5.

* cited by examiner

VALVE, BATTERY, POWER CONSUMPTION DEVICE AND MANUFACTURING APPARATUS AND METHOD FOR VALVE

CROSS-REFERENCE TO RELATED APPLICATIONS

This application is a continuation of International Application No. PCT/CN2020/139774, filed on Dec. 26, 2020, the disclosure of which is hereby incorporated by reference in its entirety.

TECHNICAL FIELD

The present application relates to the technical field of batteries, in particular to a valve, a battery, a power consumption device and a manufacturing apparatus and method for the valve.

BACKGROUND

Lithium-ion batteries are commonly used in vehicles for the moment. As a rechargeable battery, they have the advantages of small size, high energy density, high power density, high recycling and long storage time.

The battery generally includes a box body and a battery cell (rechargeable) in the box body, where the box body can provide a sealed environment for the battery cell, so as to avoid influence of liquid or foreign matters on charging or discharging of the battery cell. Fire caused by thermal runaway of the battery cell inside general batteries is difficult to control.

SUMMARY

Embodiments of the present application provide a valve, a battery, a power consumption device and a manufacturing apparatus and method for the valve, so as to solve the problem that fire caused by thermal runaway of a battery cell inside a battery is difficult to control.

In a first aspect, the embodiment of the present application provides a valve. The valve includes a valve body and a closing member, the valve body being configured to be mounted on a box body, and the valve body being provided with a medium injection port configured to be connected to a fire-fighting device; and the closing member being connected to the valve body and closing the medium injection port, the closing member being configured to open the medium injection port when a pressure or a temperature inside the box body reaches a threshold, so as to relieve the pressure inside the box body and allow the fire-fighting device to inject a fire fighting medium into the box body through the medium injection port.

In the above solution, the medium injection port may be connected to the fire-fighting device, so as to inject the fire-fighting medium into the box body through the fire-fighting device. When the thermal runaway of the battery cell inside the box body makes the pressure or the temperature inside the box body reach the threshold, the closing member opens the medium injection port, and the pressure in the box body may be released through the medium injection port. After the medium injection port is opened, the fire-fighting device may be connected to the medium injection port, and the fire-fighting medium provided by the fire-fighting device may enter the box body through the medium injection port, so as to cool the battery cell inside the box body and reduce the risk of large-area thermal diffusion of the battery cell inside the box body, thereby quickly and effectively controlling fire inside the box body and reducing economic losses caused by the fire.

In some embodiments, the valve body is provided with a pressure relief port, the closing member closes the pressure relief port, and the closing member is configured to open the pressure relief port and the medium injection port when the pressure or the temperature inside the box body reaches the threshold, so as to relieve the pressure inside the box body.

In the above solution, the valve body is further provided with the pressure relief port, and the pressure relief port and the medium injection port may be opened through the closing member. After the pressure relief port and the medium injection port are opened by the closing member, the pressure inside the box body may be released through the pressure relief port and the medium injection port, and the fire-fighting medium provided by the fire-fighting device may also enter the box body through the medium injection port and the pressure relief port in sequence to control the fire inside the box body.

In some embodiments, the valve body includes a body and a mounting member, where the pressure relief port is provided on the body, and the closing member is connected to the body; and the mounting member is mounted on the body, and the medium injection port is provided on the mounting member.

In the above solution, the valve body, in a split structure, is simple in structure and is conducive to arrangement of the closing member. As the medium injection port is provided on the mounting member, and the mounting member is a member connected to the fire-fighting device, the mounting member may be replaced as required.

In some embodiments, the pressure relief port includes an inlet and an outlet; the inlet is configured to be connected with the medium injection port when the closing member opens the pressure relief port and the medium injection port; and the outlet is configured for exhausting gas in the box body when the fire-fighting medium enters the box body through the medium injection port and the inlet in sequence.

In the above solution, the inlet and the outlet are a portion of the pressure relief port, and when the pressure inside the box body is released, a discharge in the box body may be exhausted out of the box body through the inlet and outlet. When the closing member opens the pressure relief port and the medium injection port, the inlet is connected with the medium injection port, the fire-fighting medium provided by the fire-fighting device may enter the box body through the medium injection port and the inlet in sequence, and at the same time, the gas in the box body may be exhausted out of the box body through the outlet, so as to achieve the purpose of balancing pressures inside and outside the box body and reduce the risk that the fire-fighting medium provided by the fire-fighting device is not prone to enter the box body due to gradual increase of the pressure inside the box body.

In some embodiments, the pressure relief port includes a plurality of inlets distributed circumferentially at intervals and a plurality of outlets distributed circumferentially at intervals; and the plurality of outlets are located at peripheries of the plurality of inlets.

In the above solution, in the pressure relief port, the plurality of inlets and the plurality of outlets are distributed circumferentially at intervals, such that the fire-fighting medium may enter the box body more quickly through the plurality of inlets, and the gas in the box body may be exhausted out of the box body more quickly through the plurality of outlets. The plurality of outlets are located at the peripheries of the plurality of inlets, and are reasonably arranged, such that the gas in the box body is more conveniently exhausted out of the box body through the plurality of outlets in a process of continuously entering the box body of the fire-fighting medium.

In some embodiments, the mounting member is provided with an exhaust port independent of the medium injection port; and when the closing member opens the pressure relief port and the medium injection port, the gas may be exhausted out of the box body through the outlet and the exhaust port in sequence.

In the above solution, the mounting member is provided with the exhaust port independent of the medium injection port, and the exhaust port provided may reduce a blocking effect of the mounting member, mounted on the body, on the outlet, such that the gas in the box body may be exhausted out of the box body through the outlet and the exhaust port in sequence, thus improving smoothness of gas exhausting out of the box body and enabling the gas in the box body to be exhausted more quickly.

In some embodiments, the mounting member includes a pipe, a ring and a connector, the medium injection port being provided in the pipe, and the pipe being configured to be connected to the body; the ring sleeving the pipe; and the connector connecting the pipe to the ring; where the exhaust port is formed between an inner peripheral wall of the ring and an outer peripheral wall of the pipe.

In the above solution, the medium injection port is provided in the pipe, the exhaust port is formed between the inner peripheral wall of the ring and the outer peripheral wall, so as to make the medium injection port independent of the exhaust port. The mounting member is simple in structure and is easy to be molded and manufactured.

In some embodiments, the mounting member is in plug-in fit with the body.

In the above solution, the mounting member is in plug-in fit with the body, such that the mounting member and the body may be quickly assembled and disassembled.

In some embodiments, the mounting member is plugged in the body.

In the above solution, the mounting member is plugged in the body, which may reduce a space, outside the body, occupied by the mounting member and make an overall structure of the valve more compact.

In some embodiments, a plurality of support portions are arranged in the body circumferentially at intervals, the support portions being configured for supporting an outer peripheral surface of the mounting member.

In the above solution, the plurality of support portions, which are used for supporting the outer peripheral surface of the mounting member, are arranged in the body circumferentially at intervals, that is to say, after the mounting member is plugged in the body, the support portions support the outer peripheral surface of the mounting member, thereby realizing positioning of the mounting member and guaranteeing that the mounting member has desirable stability after being plugged in the body.

In some embodiments, the support portion includes a support surface and a guide bevel connected to the support surface; and the guide bevel is configured for guiding the mounting member into the body, so as to make the support surface be in contacted with the outer peripheral surface of the mounting member.

In the above solution, the guide bevel of the support portion plays a very good guide role in the process of plugging the mounting member in the body, such that the mounting member may more easily enter the body and be in contacted with the support surface of the support portion.

In some embodiments, the fire-fighting device is provided with a butt joint portion, and the medium injection port includes a plurality of butt joint holes coaxially arranged with different diameters for butting joint with the butt joint portion.

In the above solution, the plurality of butt joint holes with different diameters may be applied to butt joint portions with different diameters, and the butt joint portions with different diameters may be in a butt joint with the medium injection port.

In some embodiments, the valve further includes a fastener, the fastener being connected to the valve body, so as to fix the valve body on the box body.

In the above solution, the valve body may be fixed on the box body through the fastener.

In some embodiments, the fastener is detachably connected to the valve body, and the fastener is configured for clamping a box body wall of the box body in cooperation with the valve body.

In the above solution, the fastener clamps the box body wall of the box body in cooperation with the valve body, so as to fix the valve body on the box body. The fastener is detachably connected to the valve body, the fastener is connected to the valve body, the valve may be mounted on the box body, the fastener is removed from the valve body, and the valve body may be removed from the box body, facilitating disassembly and assembly of the valve.

In a second aspect, the embodiment of the present application provides a battery. The battery includes a box body, a battery cell and the valve provided by any one of the embodiments of the first aspect; the battery cell is accommodated in the box body; and the valve body is mounted on the box body.

In the above solution, the fire-fighting medium may be injected into the box body through the valve with a pressure relief function, so as to cool the battery cell inside the box body and reduce the risk of large-area thermal diffusion of the battery cell inside the box body, thereby quickly and effectively controlling fire inside the box body and reducing economic losses caused by the fire.

In a third aspect, the embodiment of the present application provides a power consumption device, which includes the battery provided by any one of the embodiments of the second aspect.

In a fourth aspect, the embodiment of the present application provides a method for manufacturing the valve. The method includes: providing a valve body, where the valve body is provided with a medium injection port configured to be connected to a fire-fighting device, and the valve body is configured to be mounted on a box body; providing a closing member; and connecting the closing member to the valve body, so as to make the closing member close the medium injection port; where the closing member is configured to open the medium injection port when a pressure or a temperature inside the box body reaches a threshold, so as to relieve the pressure inside the box body and allow the fire-fighting device to inject a fire-fighting medium into the box body through the medium injection port.

In a fifth aspect, the embodiment of the present application further provides an apparatus for manufacturing the valve. The apparatus includes a first providing device, a second providing device and an assembly device, where the first providing device is configured for providing a valve body, the valve body is provided with a medium injection port configured to be connected to a fire-fighting device, and the valve body is configured to be mounted on a box body; the second providing device is configured for providing a closing member; and the assembly device is configured for connecting the closing member to the valve body, so as to make the closing member close the medium injection port; where the closing member is configured to open the medium injection port when a pressure or a temperature inside the box body reaches a threshold, so as to relieve the pressure inside the box body and allow the fire-fighting device to inject a fire-fighting medium into the box body through the medium injection port.

BRIEF DESCRIPTION OF DRAWINGS

To describe the technical solutions in the embodiments of the present application more clearly, the following briefly describes the accompanying drawings required in the embodiments of the present application. Apparently, the accompanying drawings in the following descriptions show merely some embodiments of the present disclosure, and a person of ordinary skill in the art can still derive other accompanying drawings from these accompanying drawings without creative efforts.

In the accompanying drawings, the accompanying drawings are not drawn to actual scale.

Reference numerals: 10—box body; 11—first portion; 12—second portion; 13—box body wall; 131—mounting hole; 20—battery cell; 30—valve; 31—valve body; 311—medium injection port; 3111—butt joint hole; 3112—connection hole; 312—pressure relief port; 3121—inlet; 3122—outlet; 313—body; 3131—cylinder; 3132—separator; 3133—support portion; 3133a—support surface; 3133b—guide bevel; 314—mounting member; 3141—exhaust port; 3142—pipe; 3143—ring; 3144—connector; 3145—boss; 32—closing member; 33—fastener; 40—bus component; 100—battery; 200—controller; 300—motor; 1000—vehicle; 2000—manufacturing apparatus; 2100—first providing device; 2200—second providing device; 2300—assembly device.

DESCRIPTION OF EMBODIMENTS

To make the objectives, technical solutions, and advantages of the embodiments of the present application clearer, the following will clearly describes the technical solutions in the embodiments of the present application with reference to the accompanying drawings in the embodiments of the present application the described embodiments are some rather than all of the embodiments of the present application. Based on the embodiments of the present application, all other embodiments obtained by those of ordinary skill in the art without making creative efforts fall within the scope of protection of the present application.

Unless otherwise defined, all technical and scientific terms used in the present application have the same meanings as those commonly understood by those who belong to the technical field of the present application. In the present application, the terms used in the specification of the present application are merely for the purpose of describing specific embodiments, and are not intended to limit the present application. The terms "including" and "having" and any variations thereof in the specification and claims of the present application and the above accompanying drawings are intended to cover non-exclusive inclusion. The terms "first", "second", etc. in the specification and claims of the present application or the above accompanying drawings are used to distinguish different objects, but not to describe a specific order or primary and secondary relationship.

Reference to an "embodiment" in the present application means that a specific feature, structure or characteristic described in conjunction with an embodiment may be included in at least one embodiment of the present application. The appearance of this phrase in various places in the specification does not necessarily mean the same embodiment, nor is it an independent or alternative embodiment mutually exclusive with other embodiments.

In the description of the present application, it should be noted that, unless otherwise explicitly specified and defined, the terms "mounting", "connecting", "connection" and "attachment" should be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present application could be understood according to specific circumstances.

In the embodiments of the present application, the same reference signs refer to same components, and for the sake of brevity, detailed descriptions of the same parts are omitted in different embodiments. It should be understood that a thickness, a length, a width and other dimensions of various parts and an overall thickness, length, width and other dimensions of an integrated device shown in the accompanying drawings in the embodiments of the present application are merely exemplary, and should not constitute any limitation on the present application.

The term "a plurality of" in the present application means two or more.

In the present application, battery cells may include a lithium ion secondary battery, a lithium ion primary battery, a lithium-sulfur battery, a sodium lithium-ion battery, a sodium ion battery or a magnesium ion battery, etc., which is not limited by the embodiments of the present application. The battery cell may be cylindrical, flat, cuboid or other shapes, which is not limited by the embodiments of the present application. Generally, the battery cells are divided into three types according to the packaging mode: cylindrical battery cells, square battery cells and pouch battery cells, which is not limited by the embodiments of the present application.

The battery mentioned in the embodiment of the present application refers to a single physical module which includes one or a plurality of battery cells and therefore provides a higher voltage and capacity. For example, the battery mentioned in the present application may include a battery module or a battery pack, etc. Generally, the battery includes a box body for packaging one or the plurality of battery cells. The box body may prevent liquid or other foreign matter from affecting charging or discharging of the battery cell.

The battery cell includes an electrode assembly and an electrolyte, where the electrode assembly consists of a positive electrode plate, a negative electrode plate and a separator. The battery cell works mainly depending on movement of metal ions between the positive electrode plate and the negative electrode plate. The positive electrode plate includes a positive current collector and a positive active material layer, the positive active material layer coating a surface of the positive current collector, a positive current collector not coated with the positive active material layer protrudes out of the positive current collector coated with the positive active material layer, and the positive current collector not coated with the positive active material layer serves as a positive tab. A lithium ion battery is taken as an example, a positive current collector may be made from aluminum, and the positive active material may be lithium cobalt oxide, lithium iron phosphate, ternary lithium or lithium manganate oxide, etc. The negative electrode plate includes a negative current collector and a negative active material layer, the negative active material layer coating a surface of the negative current collector, a negative current collector not coated with the negative active material layer protrudes from the negative current collector coated with the negative active material layer, and the negative current collector not coated with the negative active material layer serves as a negative tab. The negative current collector may be made from copper, and the negative active material may be carbon, silicon, etc. In order to guarantee fusing does not occur during large current flow, a plurality of positive tabs are stacked together, and a plurality of negative tabs are stacked together. The separator film may be made from polypropylene (PP), polyethylene (PE), etc. In addition, the electrode assembly may be in a winding structure or a laminated structure, which is not limited in the embodiments of the present application.

At present, a battery is generally composed of a box body and a battery cell in the box body, among which the box body may provide a sealed environment for the battery cell. In order to guarantee safety of the battery, an explosion-proof valve is arranged on the box body, and the explosion-proof valve relieves a pressure inside the box body during thermal runaway of the battery cell.

The applicant finds that during thermal runaway of the battery cell inside the battery, because the battery cell is located in the box body, the fire-fighting medium may only act on the outside of the box body, and the fire-fighting medium may not enter the box body, resulting in poor fire-fighting effect and difficulty in fire control.

In view of this, the embodiment of the present application provides a technical solution. A valve body is provided with a medium injection port configured to be connected to a fire-fighting device, a closing member is connected to the valve body and closes the medium injection port, and the closing member is configured to open the medium injection port when a pressure or a temperature inside a box body reaches a threshold, so as to relieve the pressure inside the box body and allow the fire-fighting device to inject a fire-fighting medium into the box body through the medium injection port. After the medium injection port is opened by the closing member due to the thermal runaway of the battery cell inside the battery, the fire-fighting medium may enter the box body through the medium injection port, so as to cool the battery cell inside the box body and reduce the risk of large-area thermal diffusion of the battery cell inside the box body, thereby quickly and effectively controlling fire inside the box body and reducing economic losses caused by the fire.

The technical solution described in the embodiment of the present application is applicable to a battery and a power consumption device using the battery.

The power consumption device may be a vehicle, a mobile phone, a portable apparatus, a notebook computer, a ship, a spacecraft, an electric toy, electric tool, etc. The vehicles may be a fuel vehicle, a gas vehicle or a new energy vehicle, and the new energy vehicle may be a battery electric vehicle, a hybrid electric vehicle, an extended-range vehicle, etc. The spacecraft includes an aircraft, a rocket, a space shuttle, a spaceship, etc. The electric toy includes fixed or mobile electric toys, such as a game machine, an electric car toy, an electric boat toy and an electric airplane toy. The electric tool includes a metal cutting electric tool, a grinding electric tool, an assembling electric tool and a railway electric tool, such as an electric drill, an electric grinder, an electric wrench, an electric screwdriver, an electric hammer, an impact electric drill, a concrete vibrator and an electric planer. The embodiment of the present application does not make special restrictions on the above power consumption device.

In the following embodiments, the vehicle is taken as an example of the power consumption device for the convenience of description.

Figure 1:
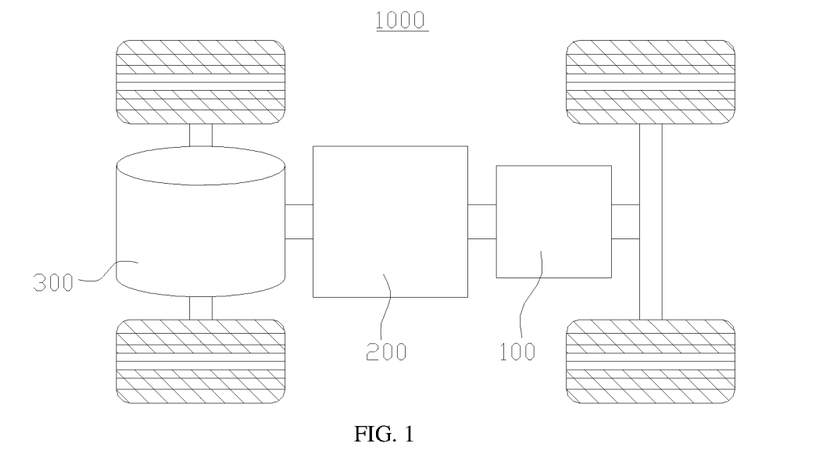
FIG. 1 is a schematic structural diagram of a vehicle provided by some embodiments of the present application.

With reference to FIG. 1, FIG. 1 is a schematic structural diagram of the vehicle 1000 provided by some embodiments of the present application. A battery 100 is arranged inside the vehicle 1000, and the battery 100 may be arranged at a bottom, a head or a tail of the vehicle 1000. The battery 100 may be used for energizing the vehicle 1000, for example, the battery 100 may be used as an operating power source of the vehicle 1000.

The vehicle 1000 may further include a controller 200 and a motor 300, where the controller 200 is used to control battery 100 to energize the motor 300, for example, for starting, navigating and driving the vehicle 1000.

In some embodiments of the present application, the battery 100 may not only be used as an operating power source for the vehicle 1000, but serve as a driving power source for the vehicle 1000, replacing or partially replacing fuel or natural gas to provide driving power for the vehicle 1000.

Figure 2:
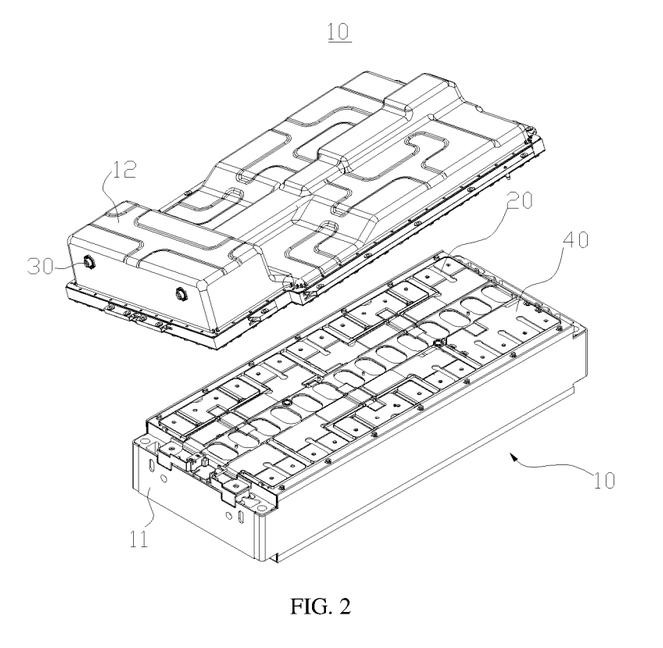
FIG. 2 is an exploded view of a battery provided by some embodiments of the present application.

With reference to FIG. 2, FIG. 2 is an exploded view of a battery 100 provided by some embodiments of the present application. The battery 100 includes a box body 10, a battery cell 20 and a valve 30, where the battery cell 20 is accommodated in the box body 10, and a valve body 31 is mounted on the box body 10.

The box body 10 is configured for accommodating the battery cell 20 to provide a sealed environment for the battery cell 20. The box body 10 may be in various shapes, such as cuboid and cylinder. In FIG. 2, the box body 10 is a cuboid exemplarily.

In some embodiments, the box body 10 includes a first portion 11 and a second portion 12, and the first portion 11 and the second portion 12 cover each other. The first portion 11 may be a hollowed structure with one side open, and the second portion 12 may also be a hollowed structure with one side open. The open side of the second portion 12 covers the open side of the first portion 11 to form a box body 10 for accommodating the battery cell 20.

In actual use, the second portion 12 may be located on a top of the first portion 11, which means that the first portion 11 may be called a lower box body 10 and the second portion 12 may be called an upper box body 10 accordingly.

It should be noted that the valve 30 may be mounted in the first portion 11 of the box body 10 or arranged in the second portion 12 of the box body 10. In FIG. 2, the valve 30 is mounted in the second portion 12 exemplarily.

There may be one or a plurality of battery cells 20 inside the box body 10. If there are a plurality of battery cells 20, the plurality of battery cells 20 may be connected to one another in series, in parallel or in a parallel-series manner, the parallel-series manner indicating that the plurality of battery cells 20 are connected in both series and parallel. The plurality of battery cells 20 may be directly connected in series, in parallel or in a parallel-series manner, and then a whole formed by the plurality of battery cells 20 is accommodated in the box body 10. Of course, the plurality of battery cells 20 may be connected in series, in parallel or in a parallel-series manner to form a battery 100 module firstly, and then a plurality of battery 100 modules are connected in series, in parallel or in a parallel-series manner to form a whole to be accommodated in the box body 10. The battery cell 20 may be a cylinder, flat, cuboid or in other shapes.

In some embodiments, the battery 100 may further include the bus component 40, and the plurality of battery cells 20 may be electrically connected to one another through the bus component 40, so as to realize series connection, parallel connection or parallel-series connection of the plurality of battery cells 20.

In the battery 100, there may be one or a plurality of valves 30 on the box body 10. In FIG. 2, two valves 30 are arranged on the box body 10 exemplarily.

Figure 3:
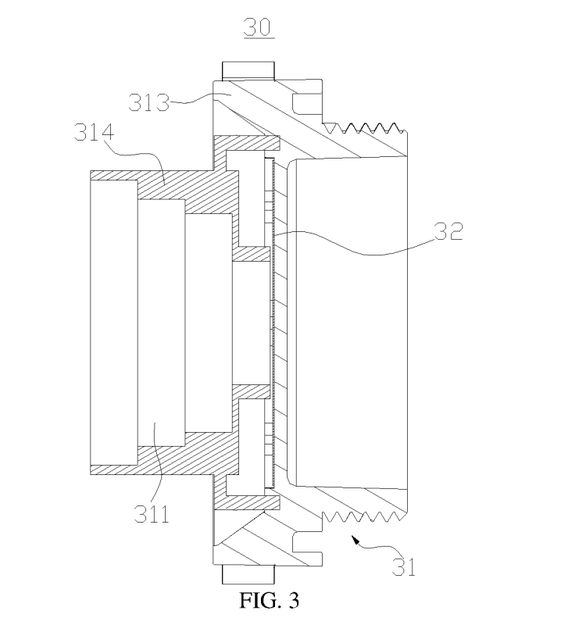
FIG. 3 is a schematic structural diagram of a valve provided by some embodiments of the present application.

With reference to FIG. 3, FIG. 3 is a structural schematic diagram of the valve 30 provided by some embodiments of the present application. The valve 30 includes a valve body 31 and a closing member 32. The valve body 31 is configured to be mounted on the box body 10, the closing member 31 is provided with the medium injection port 311 configured to be connected to a fire-fighting device (not shown in the figure), the closing member 32 is connected to the valve body 31 and closes the medium injection port 311, and the closing member 32 is configured to open the medium injection port 311 when the pressure or the temperature inside the box body 10 reaches a threshold, so as to relieve the pressure inside the box body 10 and allow the fire-fighting device to inject the fire-fighting medium into the box body 10 through the medium injection port 311.

The medium injection port 311 may be connected to the fire-fighting device, so as to inject the fire-fighting medium into the box body 10 through the fire-fighting device. When the thermal runaway of the battery cell 20 inside the box body 10 makes the pressure or the temperature inside the box body 10 reach the threshold, the closing member 32 opens the medium injection port 311, and the pressure in the box body 10 may be released through the medium injection port 311. After the medium injection port 311 is opened, the fire-fighting device may be connected to the medium injection port 311, and the fire-fighting medium provided by the fire-fighting device may enter the box body 10 through the medium injection port 311, so as to cool the battery cell 20 inside the box body 10 and reduce the risk of large-area thermal diffusion of the battery cell 20 inside the box body 10, thereby quickly and effectively controlling fire inside the box body 10 and reducing economic losses caused by the fire.

As may be known from the above, the valve 30 provided by the embodiment of the present application has two functions: firstly, when the pressure or the temperature inside the box body 10 reaches the threshold, the pressure inside the box body 10 is released to reduce the risk of explosion caused by an excessive pressure inside the box body 10; and secondly, after the medium injection port 311 is opened, the fire-fighting device may be connected to the medium injection port 311, and the valve 30 serves to achieve connection of the fire-fighting device with the box body 10, such that the fire-fighting medium provided by the fire-fighting device may enter the box body 10 through the valve 30.

In the embodiment of the present application, when the pressure or the temperature inside the box body 10 reach the threshold, the closing member 32 opens the medium injection port 311. The closing member 32 may also open the medium injection port 311 in a way of moving relative to the valve body 31. For example, the closing member 32 is a movable plate, and the closing member 32 is movably arranged on the valve body 31. When the internal pressure or the temperature inside the box body 10 reaches the threshold, the closing member 32 moves under the action of a drive mechanism, to open the medium injection port 311. The closing member 32 may also open the medium injection port 311 in a damaged way. For example, as shown in FIG. 3, the closing member 32 is an explosion-proof membrane, which may be damaged under the action of the pressure inside the box body 10 or melted in a high temperature environment, thus opening the medium injection port 311.

In the embodiment of the present application, the fire-fighting medium may be a medium capable of cooling and extinguishing fire, and the fire-fighting medium may be gas, such as inert gas and carbon dioxide gas, or liquid, such as water.

The fire-fighting device is a device for providing fire-fighting medium, which may be in various structures, which is not limited by the embodiment of the present application. Exemplarily, the fire-fighting device is provided with a butt joint portion (not shown in the figure) for a butt joint with the medium injection port 311. The butt joint portion may be a fire-fighting gun, which is connected to the medium injection port 311, and the fire-fighting medium ejected from the fire-fighting gun may enter the box body 10 through the medium injection port 311.

Figure 4:
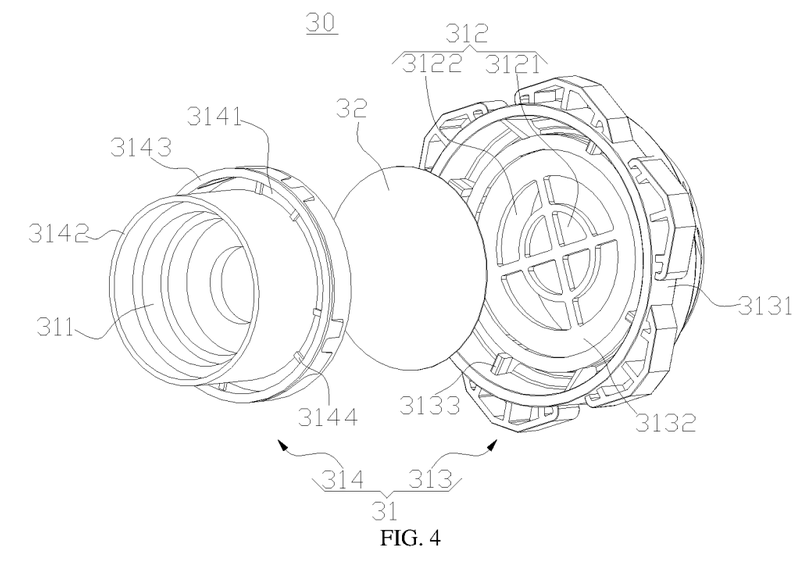
FIG. 4 is an exploded view of the valve shown in FIG. 3.

In some embodiments, with reference to FIG. 4, FIG. 4 is an exploded view of the valve 30 shown in FIG. 3, the valve body 31 is further provided with a pressure relief port 312, the closing member 32 closes the pressure relief port 312, and the closing member 32 is configured to open the pressure relief port 312 and the medium injection port 311 when the pressure or the temperature inside the box body 10 reaches the threshold, so as to relieve the pressure inside the box body 10.

The pressure relief port 312 and the medium injection port 311 may be opened by the closing member 32. After the pressure relief port 312 and the medium injection port 311 are opened by the closing member 32, the pressure inside the box body 10 may be released through the pressure relief port 312 and the medium injection port 311, and the fire-fighting medium provided by the fire-fighting device may also enter the box body 10 through the medium injection port 311 and the pressure relief port 312 in sequence to control the fire inside the box body 10.

It should be noted that closing the pressure relief port 312 by the closing member 32 means that foreign substances (dust particles, fire-fighting medium, etc.) may not enter the box body 10 through the pressure relief port 312 when the closing member 32 is not damaged. Similarly, closing the medium injection port 311 by the closing member 32 means that the foreign substances (the dust particles, the fire-fighting medium, etc.) may not enter the box body 10 through the medium injection port 311 when the closing member 32 is not damaged.

The valve body 31 may be of an integral structure or a split structure.

In some embodiments, the valve body 31 is in a split structure, the valve body 31 includes a body 313 and a mounting member 314. The pressure relief port 312 is provided in the body 313, the closing member piece 32 is connected to the body 313, the mounting member 314 is mounted in the body 313, and the medium injection port 311 is provided in the mounting member 314. The valve body 31 is simple in structure, and facilitates arrangement of the closing member 32, and the mounting member 314 may be replaced as required.

In some embodiments, the pressure relief port 312 includes an inlet 3121 and an outlet 3122, the inlet 3121 is configured to be connected with the medium injection port 311 when the closing member 32 opens the pressure relief port 312 and the medium injection port 311, and an outlet 3122 for exhausting gas in the box body 10 when the fire fighting medium enters the box body 10 through the medium injection port 311 and the inlet 3121 in sequence.

The inlet 3121 and the outlet 3122 are a portion of the pressure relief port 312, and when the pressure inside the box body 10 is released, a discharge in the box body 10 may be exhausted out of the box body 10 through the inlet 3121 and outlet 3122. When the closing member 32 opens the pressure relief port 312 and the medium injection port 311, the inlet 3121 is connected with the medium injection port 311, the fire-fighting medium provided by the fire-fighting device may enter the box body 10 through the medium injection port 311 and the inlet 3121 in sequence, and at the same time, the gas in the box body 10 may be exhausted out of the box body 10 through the outlet 3122, so as to achieve the purpose of balancing pressures inside and outside the box body 10 and reduce the risk that the fire-fighting medium provided by the fire-fighting device is not prone to enter the box body 10 due to gradual increase of the pressure inside the box body 10.

There may be one or a plurality of inlets 3121 and one or a plurality of outlets 3122 in the pressure relief port 312.

In some embodiments, as shown in FIG. 4, the pressure relief port 312 includes the plurality of inlets 3121 distributed circumferentially at intervals and the plurality of outlets 3122 distributed circumferentially at intervals; and the plurality of outlets 3122 are located at peripheries of the plurality of inlets 3121.

The plurality of inlets 3121 and the plurality of outlets 3122 are distributed circumferentially at intervals, such that the fire-fighting medium may enter the box body 10 more quickly through the plurality of inlets 3121, and the gas in the box body 10 may be exhausted out of the box body 10 more quickly through the plurality of outlets 3122. The plurality of outlets 3122 are located at the peripheries of the plurality of inlets 3121, and are reasonably arranged, such that the gas in the box body 10 is more conveniently exhausted out of the box body 10 through the plurality of outlets 3122 in a process of continuously entering the box body 10 of the fire-fighting medium.

The plurality of outlets 3122 mentioned above are located at the peripheries of the plurality of inlets 3121 may be understood that the outlets 3122 are located outside the inlets 3121 in a radial direction. As an example, the plurality of outlets 3122 are distributed in a first circumference and a plurality of inlets 3121 are distributed in a second circumference, and the first circumference and the second circumference are arranged concentrically. In a radial direction of the first circumference and in a radial direction of the second circumference, the outlets 3122 are located outside the inlets 3121, and the inlets 3121 are closer to centers of the first and second circumferences than the outlets 3122. In FIG. 4, exemplarily, there are both four inlets 3121 and four outlets 3122 in the pressure relief port 312.

Exemplarily, the body 313 includes a cylinder 3131 and a separator 3132. The cylinder 3131 has a hollowed structure with both ends open in an axial direction. The separator 3132 is fixedly arranged in the cylinder 3131. The separator 3132 in a plate-like structure, and the pressure relief port 312 is provided on the separator 3132. Taking the closing member 32 being an explosion-proof membrane as an example, the closing member 32 may be fixed on the separator 3132 to close the inlet 3121 and the outlet 3122 of the pressure relief port 312. When the pressure or the temperature inside the box body 10 reaches the threshold, the closing member 32 is broken, thereby opening the inlet 3121 and the outlet 3122.

It should be noted that in other embodiments, only an inlet 3121 are provided in the pressure relief port 312, the pressure of the box body 10 is released through the inlet 3121, and the fire-fighting medium also enters the box body 10 through the inlet 3121.

Figure 5:
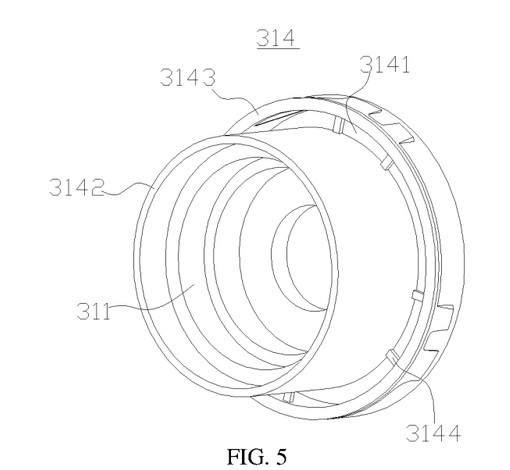
FIG. 5 is a schematic structural diagram of a mounting member shown in FIG. 4.

In some embodiments, with reference to FIG. 5, FIG. 5 is a schematic structural diagram of the mounting member 314 shown in FIG. 4. The mounting member 314 is provided with an exhaust port 3141 independent of the medium injection port 311. When the closing member 32 opens the pressure relief port 312 and the medium injection port 311, the gas may be exhausted out of the box body 10 through the outlet port 3122 and the exhaust port 3141 in sequence.

The exhaust port 3141 arranged on the mounting member 314 may reduce a blocking effect of the mounting member 314, mounted on the body 313, on the outlet 3122, such that the gas in the box body 10 may be exhausted out of the box body 10 through the outlet 3122 and the exhaust port 3141 in sequence, thus improving smoothness of gas exhausting out of the box body 10 and enabling the gas in the box body 10 to be exhausted more quickly.

In some embodiments, the mounting member 314 includes a pipe 3142, a ring 3143 and a connector 3144. The medium injection port 311 is provided in the pipe 3142, and the pipe 3142 is connected to the body 313. The ring 3143 sleeves the pipe 3142, and the pipe 3142 and the ring 3143 are connected through the connector 3144. The exhaust port 3141 is formed between an inner peripheral wall of the ring 3143 and an outer peripheral wall of the pipe 3142.

The medium injection port 311 is provided in the pipe 3142, the exhaust port 3141 is formed between the inner peripheral wall of the ring 3143 and the outer peripheral wall, so as to make the medium injection port 311 independent of the exhaust port 3141. The mounting member 314 in the structure may distribute the exhaust ports circumferentially at the periphery of the medium injection port 311, so as to match a way in which the plurality of outlets 3122 of the pressure relief port 312 are located at the peripheries of the plurality of inlets 3121, such that after the mounting member 314 is connected to the body 313, the medium injection ports 311 at the inner periphery corresponds to the plurality of inlets 3121 at the inner periphery, and the exhaust ports 3141 at the outer periphery correspond to the plurality of outlets 3122 at the outer periphery, which is reasonable in arrangement. The medium injection port 311 and the inlets form a straight-through channel for the fire-fighting medium to enter the box body 10, and the outlet port 3122 and the exhaust port 3141 form a straight-through channel for the gas in the box body 10 to be exhausted.

Exemplarily, an inner diameter of the ring 3143 is greater than an outer diameter of the pipe 3142, and the ring 3143 and the pipe 3142 are coaxially arranged.

There may be one or a plurality of connection bodies 3144 connected between the ring 3143 and the pipe 3142. In FIG. 5, a plurality of connection bodies 3144 are circumferentially distributed between the ring 3143 and the pipe 3142 exemplarily to enhance firmness between both the ring 3143 and the pipe 3142.

Figure 6:
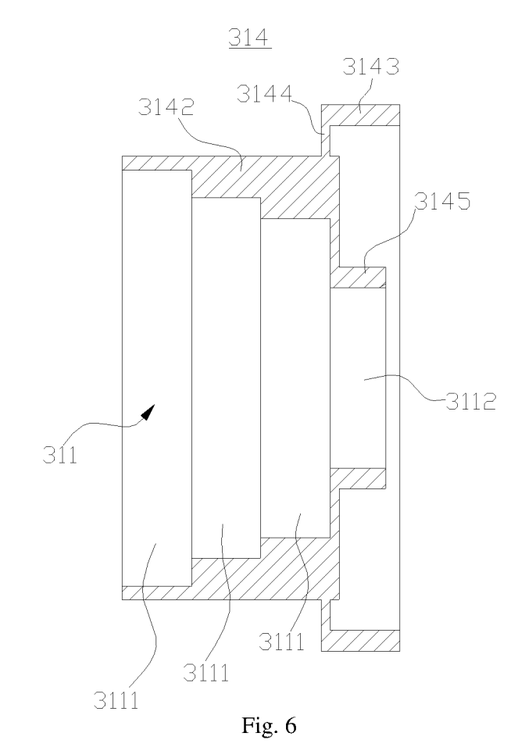
FIG. 6 is a sectional view of the mounting member shown in FIG. 5.

Exemplarily, with reference to FIG. 6, FIG. 6 is a cross-sectional view of the mounting member 314 shown in FIG. 5, the pipe 3142 is a hollowed structure with both ends open, and the medium injection port 311 is a porous channel inside the pipe 3142. A boss 3145 is arranged at one axial end of the pipe 3142, and the medium injection port 311 penetrates the boss 3145. The boss 3145 is configured for abutting against the closing member 32 fixed on the separator 3132 after the mounting member 314 is connected to the body 313. The closing member 32 is located between the boss 3145 and the separator 3132, and after the sealing member 32 is broken to open the medium injection port 311 and the pressure relief port 312, the medium injection port 311 is connected with the inlet 3121 of the pressure relief port 312.

In some embodiments, the medium injection port 311 includes a plurality of butt joint holes 3111 coaxially arranged with different diameters for butt joint with the butt joint portion of the fire-fighting device, so as to adapt to butt joint portions with different diameters.

The butt joint portion being a fire-fighting gun is taken as an example, when the fire-fighting gun is connected to the medium injection port 311, the fire-fighting gun is partially plugged in the butt joint hole 3111 that matches the fire-fighting gun.

The plurality of butt joint holes 3111 form a stepped hole structure. Exemplarily, the medium injection port 311 also includes a connection hole 3112 located in the boss 3145, the connection hole 3112 is connected to a butt joint hole 3111 with the smallest diameter among the plurality of butt joint holes 3111, and a hole diameter of the connection hole 3112 is smaller than that of the butt joint hole 3111 with the smallest diameter.

In some embodiments, the mounting member 314 is in plug-in fit with the body 313, such that the mounting member and the body may be quickly assembled and disassembled.

That the mounting member 314 is in plug-in fit with the body 313 means that the mounting member 314 may be plugged in the body 313, or the body 313 is plugged in the mounting member 314.

In some embodiments, please continue to refer to FIG. 4, the mounting member 314 is plugged in the body 313, which may reduce a space, outside the body 313, occupied by the mounting member 314 and make an overall structure of the valve 30 more compact.

Exemplarily, the mounting member 314 and the body 313 are coaxially arranged.

Where, the ring 3143 of the mounting member 314 is plugged in the cylinder 3131 of the body 313.

In some embodiments, a plurality of support portions 3133 are arranged in the body 313 circumferentially at intervals, the support portions 3133 being used for supporting an outer peripheral surface of the mounting member 314. That is, after the mounting member 314 is plugged in the body 313, the support portions 3133 support the outer peripheral surface of the mounting member 314, thereby realizing positioning of the mounting member 314 and guaranteeing that the mounting member 314 has desirable stability after being plugged in the body 313.

The plurality of support portions 3133 are circumferentially arranged on an inner side wall of the cylinder 3131 of the body 313 at intervals. After the mounting member 314 is plugged in the body 313, each support portion 3133 supports an outer peripheral surface of the ring 3143 of the mounting member 314.

Figure 7:
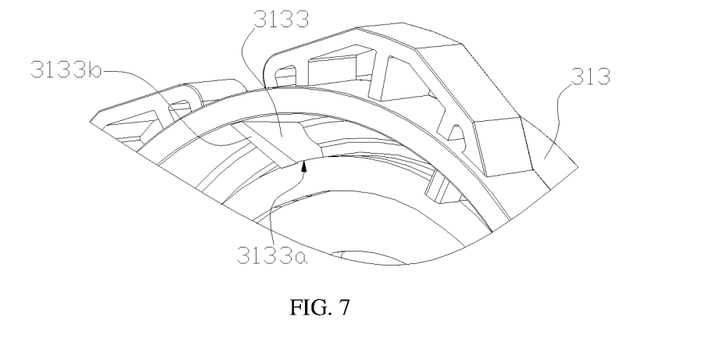
FIG. 7 is a partially enlarged view of a body shown in FIG. 4.

In some embodiments, with reference to FIG. 7, FIG. 7 is a partial enlarged view of the body 313 shown in FIG. 4. the support portion 3133 includes a support surface 3133a and a guide bevel 3133b connected to the support surface 3133a, and the guide bevel 3133b is used to guide the mounting member 314 into the body 313 such that the support surface 3133a is contacted with the outer peripheral surface of the mounting member 314.

The guide bevel 3133b of the support portion 3133 plays a very good guide role in the process of plugging the mounting member 314 in the body 313, such that the mounting member 314 may more easily enter the body 313 and be in contacted with the support surface 3133a of the support portion 3133.

The support surface 3133a is configured to be in contacted with the outer peripheral surface of the ring 3143 of the mounting member 314.

Figure 8:
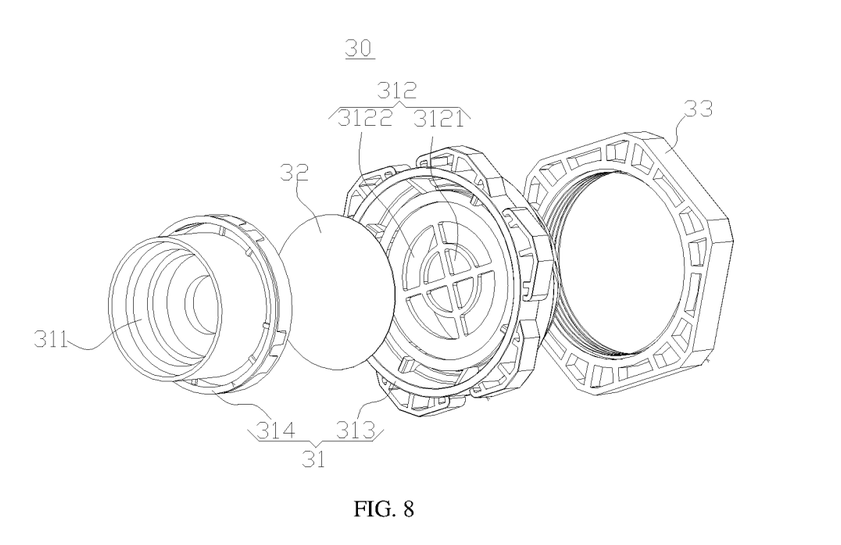
FIG. 8 is a schematic structural diagram of a valve provided by other some embodiments of the present application.

In some embodiments, with reference to FIG. 8, FIG. 8 is a schematic structural diagram of the valve 30 provided by still some embodiments of the present application, the valve 30 also includes a fastener 33, the fastener 33 is connected to the valve body 31 to fix the valve body 31 to the box body 10.

Figure 9:
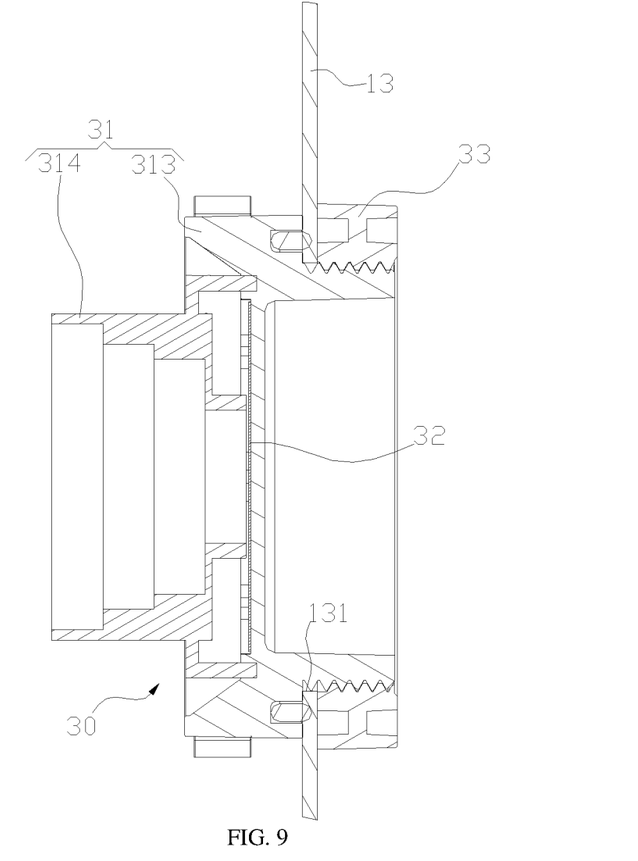
FIG. 9 is a schematic structural diagram for mounting the valve on a box body provided by some embodiments of the present application.

Optionally, with reference to FIG. 9, FIG. 9 is a schematic diagram for mounting the valve 30 on the box body 10 provided by some embodiments of the present application, the fastener 33 is detachably connected to the valve body 31, and the fastener 33 is configured to clamp a wall 13 of the box body 10 in cooperation with the valve body 31 to fix the valve body 31 on the box body 10. The fastener 33 is connected to the valve body 31, the valve may be mounted on the box body 10, the valve body 31 is removed from the box body 10, the valve body 31 may be removed from the box body 10, which facilitates disassembly and assembly of the valve 30.

Exemplarily, the fastener 33 is a nut, the body 313 of the valve body 31 is provided with external threads, the box body wall 13 of the box body 10 is provided with a mounting hole 131 through which the body 313 penetrates, the body 313 partially penetrates the mounting hole 131, the fastener 33 is screwed to a portion, provided with the external threads, of the body 313, the fastener 33 is located inside the box body wall 13, and a portion, outside the box body wall 13, of the body 313 located cooperates with the fastener 33 to clamp the box body wall 13 of the box body 10, so as to fix the valve body 31 on the box body 10.

Of course, the fastener 33 may also have other structures, for example, the fastener 33 is a screw, and a through hole for the screw to pass through is provided in the box body wall 13 of the box body 10, and the fastener 33 is screwed to the body 313 of the valve body 31 through the through hole, thereby fixing the valve body 31 to the box body 10.

In other embodiments, the valve 30 may be fixed to the box body 10 in other ways, for example, the body 313 of the valve 30 is directly screwed to a threaded hole on the box body 10.

Figure 10:
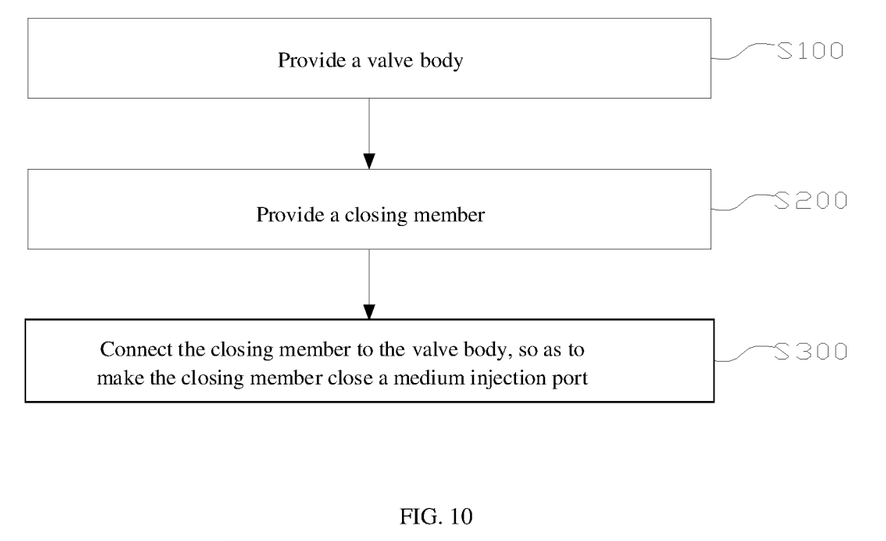
FIG. 10 is a flowchart of a method for manufacturing the valve provided by some embodiments of the present application.

With reference to FIG. 10, FIG. 10 is a flowchart of a method for manufacturing the valve 30 provided by some embodiments of the present application. The method for manufacturing the valve 30 includes:

S100: provide a valve body 31, where the valve body 31 is provided with a medium injection port 311 configured to be connected to a fire-fighting device, and the valve body 31 is configured to be mounted on a box body 10;

S200: provide a closing member 32; and

S300: connect the closing member 32 to the valve body 31, so as to make the closing member 32 close the medium injection port 311;

where the closing member 32 is configured to open the medium injection port 311 when a pressure or a temperature inside the box body 10 reaches a threshold, so as to relieve the pressure inside the box body 10 and allow the fire-fighting device to inject a fire-fighting medium into the box body 10 through the medium injection port 311.

For related structures of the valve 30 manufactured by the above manufacturing method, it may refer to the valve 30 provided by the above embodiments.

Figure 11:
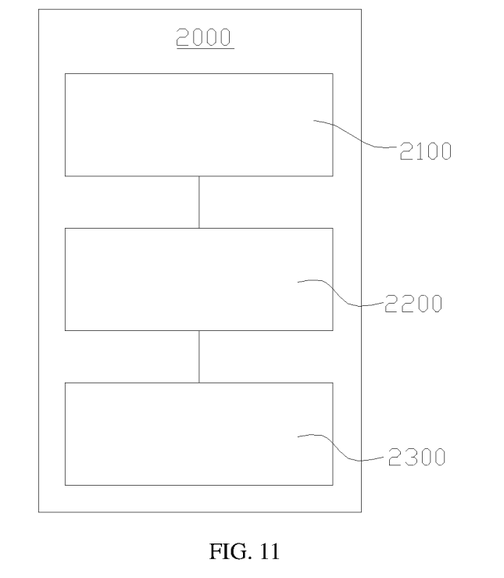
FIG. 11 is a schematic block diagram of an apparatus for manufacturing the valve provided by some embodiments of the present application.

With reference to FIG. 11, FIG. 11 is a schematic block diagram of a manufacturing apparatus 2000 for manufacturing the valve 30 provided by some embodiments of the present application. The manufacturing apparatus 2000 includes a first providing device 2100, a second providing device 2200 and an assembly device 2300.

The first providing device 2100 is configured for providing a valve body 31, where the valve body 31 is provided with a medium injection port 311 configured to be connected to a fire-fighting device, and the valve body 31 is configured to be mounted on a box body 10. The second providing device 2200 is configured for providing a closing member 32. The assembly device 2300 is configured for connecting the closing member 32 to the valve body 31 so as to make the closing member 32 close the medium injection port 311.

The closing member 32 is configured to open the medium injection port 311 when a pressure or a temperature inside the box body 10 reaches a threshold, so as to relieve the pressure inside the box body 10 and allow the fire-fighting device to inject a fire-fighting medium into the box body 10 through the medium injection port 311.

For related structures of the valve 30 manufactured by the above manufacturing apparatus 2000, it may refer to the valve 30 provided by the above embodiments.

It should be noted that examples in the present application and characteristics in examples may be combined with one another if there is no conflict.

The above embodiments are merely used to describe the technical solution of the present application, and rather than not to limit the present application, and for those skilled in the art, the application can be variously modified and changed. Any modification, equivalent substitution, improvement, and the like within the spirit and principles of the application are intended to be included in the scope of the application.

What is claimed is:

1. A valve, comprising:
   a valve body configured to be mounted on a box body, the valve body being provided with a medium injection port configured to be connected to a fire-fighting device; and
   a closing member connected to the valve body and closing the medium injection port, the closing member being configured to open the medium injection port when a pressure or a temperature inside the box body reaches a threshold, so as to relieve the pressure inside the box body and allow the fire-fighting device to inject a fire-fighting medium into the box body through the medium injection port.

2. The valve according to claim 1, wherein the valve body is provided with a pressure relief port, the closing member closes the pressure relief port, and the closing member is configured to open the pressure relief port and the medium injection port when the pressure or the temperature inside the box body reaches the threshold, so as to relieve the pressure inside the box body.

3. The valve according to claim 2, wherein the valve body comprises:
   a body, the pressure relief port being provided on the body, and the closing member being connected to the body; and
   a mounting member mounted on the body, and the medium injection port being provided on the mounting member.

4. The valve according to claim 3, wherein the pressure relief port comprises an inlet and an outlet;
   the inlet is configured to be connected with the medium injection port when the closing member opens the pressure relief port and the medium injection port; and
   the outlet is configured for exhausting gas in the box body when the fire-fighting medium enters the box body through the medium injection port and the inlet in sequence.

5. The valve according to claim 4, wherein the pressure relief port comprises a plurality of inlets distributed circumferentially at intervals and a plurality of outlets distributed circumferentially at intervals; and
   the plurality of outlets are located at peripheries of the plurality of inlets.

6. The valve according to claim 4, wherein the mounting member is provided with an exhaust port independent of the medium injection port; and
   when the closing member opens the pressure relief port and the medium injection port, the gas can be exhausted out of the box body through the outlet and the exhaust port in sequence.

7. The valve according to claim 6, wherein the mounting member comprises:
   a pipe, the medium injection port being provided in the pipe, and the pipe configured to be connected to the body;
   a ring sleeved on the pipe; and
   a connector, the connector connecting the pipe to the ring;
   wherein the exhaust port is formed between an inner peripheral wall of the ring and an outer peripheral wall of the pipe.

8. The valve according to claim 3, wherein the mounting member is in plug-in fit with the body.

9. The valve according to claim 8, wherein the mounting member is plugged in the body.

10. The valve according to claim 9, wherein a plurality of support portions are arranged in the body circumferentially at intervals, the support portions being configured for supporting an outer peripheral surface of the mounting member.

11. The valve according to claim 10, wherein a support portion comprises a support surface and a guide bevel connected to the support surface; and
the guide bevel is configured for guiding the mounting member into the body, so as to make the support surface be in contacted with the outer peripheral surface of the mounting member.

12. The valve according to claim 1, wherein the fire-fighting device is provided with a butt joint portion, and the medium injection port comprises a plurality of butt joint holes coaxially arranged with different diameters for butting joint with the butt joint portion.

13. The valve according to claim 1, wherein the valve further comprises:
a fastener connected to the valve body, so as to fix the valve body on the box body.

14. The valve according to claim 13, wherein the fastener is detachably connected to the valve body, and the fastener is configured for clamping a box body wall of the box body in cooperation with the valve body.

15. A battery, comprising:
a box body;
a battery cell accommodated in the box body; and
the valve according to any one of claim 1, the valve being mounted on the box body.

16. The battery according to claim 15, wherein the valve body is provided with a pressure relief port, the closing member closes the pressure relief port, and the closing member is configured to open the pressure relief port and the medium injection port when the pressure or the temperature inside the box body reaches the threshold, so as to relieve the pressure inside the box body.

17. The battery according to claim 16, wherein the valve body comprises:
a body, the pressure relief port being provided on the body, and the closing member being connected to the body; and
a mounting member mounted on the body, and the medium injection port being provided on the mounting member.

18. The battery according to claim 17, wherein the pressure relief port comprises an inlet and an outlet;
the inlet is configured to be connected with the medium injection port when the closing member opens the pressure relief port and the medium injection port; and
the outlet is configured for exhausting gas in the box body when the fire-fighting medium enters the box body through the medium injection port and the inlet in sequence.

19. An electric device, comprising the battery of claim 15.

20. A method for manufacturing the valve, comprising:
providing a valve body, wherein the valve body is provided with a medium injection port configured to be connected to a fire-fighting device, and the valve body is configured to be mounted on a box body;
providing a closing member; and
connecting the closing member to the valve body, so as to make the closing member close the medium injection port;
wherein the closing member is configured to open the medium injection port when a pressure or a temperature inside the box body reaches a threshold, so as to relieve the pressure inside the box body and allow the fire-fighting device to inject a fire-fighting medium into the box body through the medium injection port.

* * * * *